United States Patent [19]

Grafton

[11] 4,006,299
[45] Feb. 1, 1977

[54] FLAT FIELD SCANNING SYSTEM

[75] Inventor: David A. Grafton, Santa Monica, Calif.

[73] Assignee: Xerox Corporation, Stamford, Conn.

[22] Filed: Dec. 11, 1974

[21] Appl. No.: 531,848

[52] U.S. Cl. ............................ 358/293; 358/208
[51] Int. Cl.² ........................................ H04N 1/02
[58] Field of Search .......... 178/7.6, 7.7, 7.1, 7.8, 178/6.6 R; 250/230

[56] References Cited

UNITED STATES PATENTS 2,971,695  2/1961  Sick .................................. 250/230

Primary Examiner—Howard W. Britton
Assistant Examiner—Edward L. Coles
Attorney, Agent, or Firm—James J. Ralabate; Michael J. Colitz, Jr.; Franklyn C. Weiss

[57] ABSTRACT

A scanning system is provided which uses directed light from a scanning element, which directed light is reflected from a curved reflective surface for scanning across a medium with a planar object surface. The scanning element includes a planar reflective facet, such as the planar mirrored surface of a galvanometer, which scans the light across the curved reflective surface in a direction normal to its axis of curvature. To provide a linear focal line, the planar surface is tilted from its optical axis by a first angle and is off-set for rotation about an axis at a second angle from an optical axis orthogonal to the optical axis of the curved surface.

14 Claims, 4 Drawing Figures

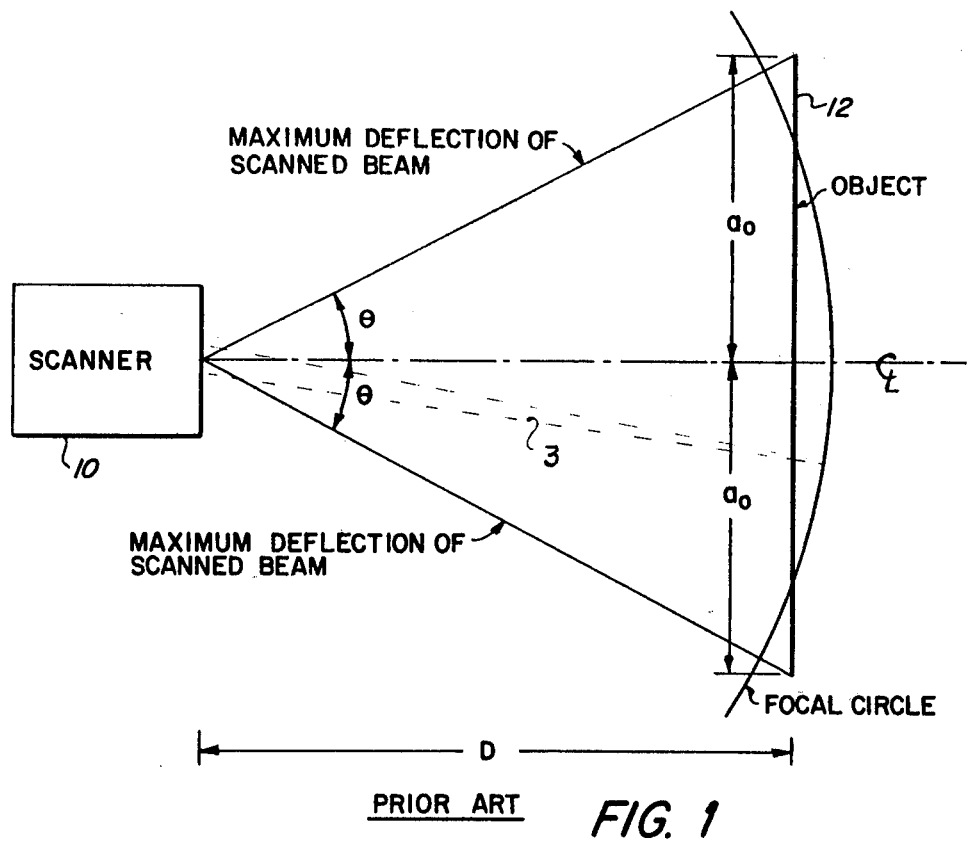
PRIOR ART    FIG. 1
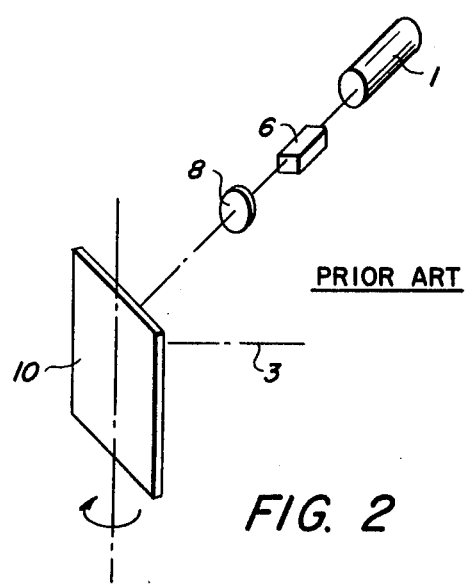
PRIOR ART
FIG. 2

FLAT FIELD SCANNING SYSTEM

BACKGROUND OF THE INVENTION

This invention relates to a scanning system for communicating video information to a scanned medium, and more particularly to a scanning system which utilizes a curved reflective surface between the scanning element and the scanned medium for field flattening.

Much attention has been given to various optical approaches in flying spot scanning for the purpose of imparting the information content of a modulated light beam to a scanned medium. Galvanometer arrangements have been used to scan the light across a document for recording its information content thereon. Such arrangements have included planar reflecting mirrors which are driven in an oscillatory fashion. Other approaches have made use of multifaceted mirrors which are driven continuously. Various efforts have been made to define the spot size in order to provide for an optimum utilization of the scanning system.

One such effort is that described in U.S. Pat. No. 3,675,016. The approach used was to make the spot size invariant and as small as possible by defining the dimensions of the focused beam so that only part, preferably half, of a mirror facet is illuminated during scanning. This teaching alludes to generalized techniques for assuring the constancy of the size of the aperture of a rotating mirror scanning system.

Other approaches, such as that taught in U.S. patent application Ser. No. 488,332, filed on July 15, 1974, now abandoned, and assigned to the assignee of the present invention, have sought to assure a uniform spot size at the scanning medium. A convolution of focusing elements may be selected, for example, to provide an adequate depth of focus at the planar surface of the medium to compensate for focal plane errors due to the arcuate path of the scanned spot. Another approach taught by Buck, U.S. Pat. No. 3,782,803, provides a flat mirror scanner that includes a plurality of curved mirrors in convolution with a rotating polygon that results in a raster scan to a planar target.

The present invention offers still another approach to the avoidance of focal plane error.

It is thus an object of the present invention to provide a scanning system which avoids focal plane error.

It is yet another object of the present invention to provide a scanning system which provides an effective uniform spot size at the contact loci of the spot with the scanned medium.

It is a further object of the present invention to provide a scanning system which utilizes a curved reflective surface in combination with a scanning element having a planar reflective facet rotating in a particular angular orientation with the curved surface to scan the spot throughout a linear focal line.

Other objects of the invention will be evident from the description hereinafter presented.

SUMMARY OF THE INVENTION

The invention provides a scanning system which employs a scanning element for directing a beam of light to focus to a spot upon the planar surface of a medium and for enabling the spot to traverse a linear scan line. A light source, such as a laser, generates the beam of light controlled by the scanning element. The directed light beam is reflected from a curved or spherical reflective surface for scanning the spot across the planar object surface.

Another feature of the invention is the modulation of the original light beam by means of a video signal. The information content within the video signal is thereby imparted to the light beam itself. The medium to be scanned is one which is responsive to the modulated beam and records its information content as contained within the scanning spot in a usable form on its surface across the scan width.

Still another feature of the invention is that the scanning element includes a planar reflective facet, such as the planar mirrored surface of a galvanometer, which scans the light beam across the curved reflective surface in a direction parallel to its axis of curvature.

Yet another feature of the invention is that a linear scan line is provided by the planar surface of the scanning element being tilted from its optical axis by a first angle and being off-set for rotation about an axis at a second angle from an optical axis orthogonal to the optical axis of the curved reflective surface.

These and other features which are considered to be characteristic of this invention are set forth with particularity in the appended claims. The invention itself, however, as well as additional objects and advantages thereof, will best be understood in the following description when considered in conjunction with the accompanying drawings.

DESCRIPTION OF THE DRAWINGS

FIG. 1 is a schematic drawing of conventional prior art scanning geometry;

FIG. 2 is an isometric illustration of a prior art scanning element in conjunction with a source of imaged, modulated light;

DESCRIPTION OF THE PREFERRED EMBODIMENT

Figure 3:
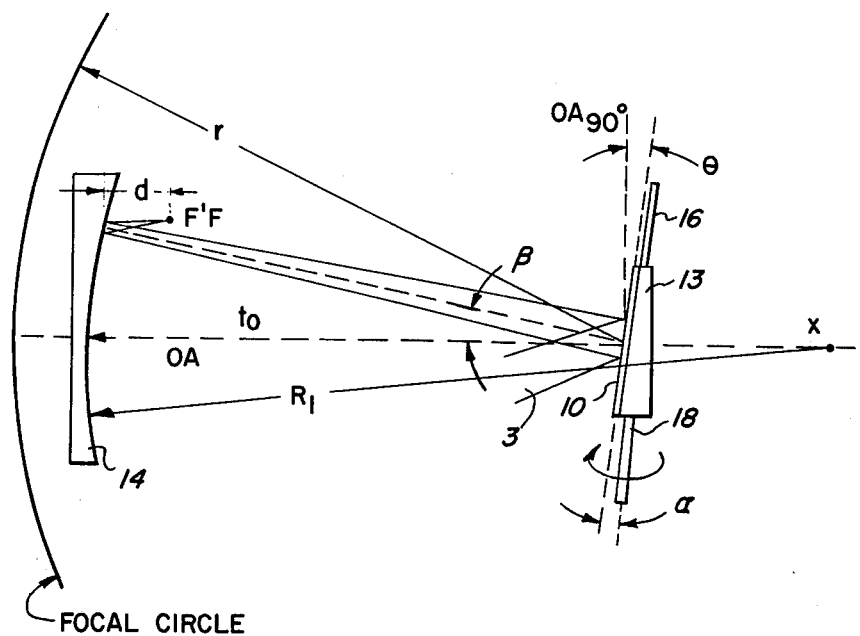
FIG. 3 is a schematic drawing of a side perspective of a scanning system in accordance with the invention.

In FIG. 1, conventional prior art scanning geometry is shown. A scanning element 10 directs a light beam 3 throughout a scan angle $2\Theta$. The beam 3 is imaged to a spot in an arcuate focal circle which is designed in relation to a medium with a planar object surface 12. The focused spot is scanned by the scanner 10 throughout a scan width of $2a_o$ across the surface 12. Focal plane errors are associated with such a scanning geometry in that the planar surface 12 does not match the focal circle through which the spot maintains a uniform size. The scanner 10 is shown located at a distance D from the surface 12.

The scanner 10 may any conventional scanning element, such as an acousto-optical deflector, a scanning polygon, or even a galvanometer. In FIG. 2, is shown a rotating mirror 10 as the scanning element. A light source 1 provides the original light beam for utilization by the scanning system. The light source 1 is preferably a laser which generates a collimated beam of monochromatic light which may easily be modulated by a modulator 6 in conformance with the information contained in a video signal.

The modulator 6 may be any suitable electro-optical modulator for recording the video information in the form of a modulated light beam at its output. The modulator 6 may be, for example, a Pockel's cell comprising a potassium dihydrogen phosphate crystal, whose index of refraction is periodically varied by the application of the varying voltage which represents the video signal. The video signal may contain information either by means of binary pulse code modulation or a wideband frequency code modulation. In any event, by means of the modulator 6, the information within the video signal is represented by the modulated light beam.

The light beam is imaged by a lens 8 to a spot in a focal circle defined with respect to the planar surface 12. While various prior art teachings have used field-flattened lenses to correct for focal plane error, such approaches have required the use of multi-element lenses and/or large amounts of glass for the lens elements. An additional disadvantage of this approach is that materials may not be available for the fabrication of such lenses, as in the case of a $CO_2$ laser providing the light beam.

In FIG. 3 is shown a scanning system in accordance with the invention. The light beam 3 is directed by a planar mirror 10, which is mounted on a scanner base 13, against a spherical mirror 14 which in turn redirects the beam 3 for scanning the imaged spot throughout a focal plane F'F, which is directed into the plane of the FIG. 3. The spherical mirror 14 has its center of curvature at a point $x$ on the same axis as the center of the rotating mirror 10 with a radius $R_1$. The spherical mirror 14 causes the curved scanning field imaged at the focal circle to be reflected and imaged upon the plane F'F. $R_1$ is selected in relation to other parameters of the system to produce the flat field at F'F in which all images formed are essentially diffraction limited. The relationship beteween the system parameters which is to be maintained is embodied in the following equation:

$$d \approx (2(d/R_1) - 1.0)(r - t_o),$$

where $d$ is the back focal length between the focal plane F'F and the curved surface of the mirror 14, $r$ is the radius of the focal circle, and $t_o$ is the distance from the intersection of the optical axis with the center of rotation of the mirror 10 to the surface of the mirror 14 along the axis OA. Although the focal circle is shown in FIG. 3 for purposes of illustrating the radius $r$, it should be noted that, for the direction of scan shown in the figure, the actual focal circle would extend orthogonal to the plane of the paper.

In this preferred embodiment, the planar mirror 10 is scanned off-axis from the axis OA by an angle $\beta$ provided by the tilting of the mirror 10 by an angle $\Theta$ form an optical axis $OA_{90}$, which is orthogonal to the axis OA. The angle $\beta$ is therefore equal to $2\Theta$. This off-axis operation of the scanning mirror 10 of the present invention provides for the physical location of a medium to be scanned in the plane F'F without any interference with the beam 3.

Figure 4:
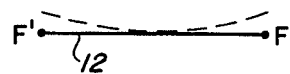
FIG. 4 is a schematic drawing of a front perspective of the scanning system of the invention illustrating only the scan line F'F.

As shown in FIG. 4, the scanned spot, without the teachings of the present invention, would traverse a plane throughout a bowed trace, shown as a dotted representation. Such a trace is not desirable for raster scanning.

The desired trace is a linear scan line in plane F'F whose representation is shown in solid in FIG. 4. The bowed trace is linearized by off-setting the axis of rotation of the scanning mirror 10 by an angle $\alpha$ from a conventional axis of rotation located in the plane of the mirror 10. The shaft 16 would represent a means for rotating the mirror 10 about an axis positioned in the plane of the mirror 10. In this preferred embodiment, however, the mirror 10 is rotated about a corrected axis by means of the shaft 18 which is off-set from the plane of the mirror 10 by the angle $\alpha$. The combination of an angular tilt of the mirror 10 with the angular off-set of rotation of the mirror 10 provides a nutation of the mirror 10 which results in the desired linear scan line in the plane F'F.

The parameters of the system which has found to satisfy all conditions resulting in a linearized scan line are as follows: $r = 50$ inches, $R_1 = 95.33$ inches, $t_o = 37.35$ inches, $d = 10$ inches, the f/number of the cone of the beam 3 between the mirror 10 and the spherical mirror 14 is approximately 38, $\Theta = 5°$, and $\alpha = 1°$. Of course, all of the non-angular dimensions may be scaled either up or down to accomodate various dimensioned optical scanning systems over a wide range of optical parameters with $\Theta$ and $\alpha$ remaining constant. For different off-axis operation of the scanning mirror 10, new values for the angles $\Theta$ and $\alpha$ are obtained in accordance with the present invention to provide a linear scan line in the plane F'F.

The optical scanning system disclosed in this preferred embodiment has related to a "write" mode wherein a photosensitive medium may provide the object surface 12 for the recording of the information content of the scanning spot. In a "read" mode, an original picture or document called the object would provide the object surface 12 to be scanned by an unmodulated beam 3 to determined the reflected or transmitted intensity (and possibly color) vs. position.

Obviously, many modifications of the present invention are possible in light of the above teaching. It is therefore to be understood that, in the scope of the appended claims, the invention may be practiced other than as specifically described.

What is claimed is:

1. An optical scanning system comprising:
means for providing a beam of light,
rotatable planar reflective means for directing said beam upon rotation throughout a predetermined scan angle
means for rotating said planar reflective means, and
curved reflective means positioned adjacent said planar reflective means for imaging said beam as a spot and redirecting the beam directed thereto from said planar reflective means such that said spot traverses a flat focal plane, the plane of said planar reflective means being tilted at a first angle from an axis orthogonal to the optical axis of said curved reflective means, the axis of rotation of said planar reflective means being off-set at a second angle from the plane of said planar reflective means whereby said planar reflective means provides a linear traverse of said spot in the flat focal plane as said planar reflective means is rotated about its axis of rotation.

2. The system as defined in claim 1 wherein the radius $r$ of an arcuate focal plane which normally would be traversed by the beam directed from said planar reflective means and the radius $R_1$ of said curved reflective means is related by the equation $$d \approx (2(d/R_1) - 1.0)(r - t_o)$$

where $d$ is the back focal length between the flat focal plane and the curved surface of said curved reflective means and $t_0$ is the distance from the intersection of the optical axis of said curved reflective means with the center of rotation of said reflective means along the optical axis.

3. The system as defined in claim 2 wherein said planar reflective means is a planar mirror.

4. The optical scanning system as defined in claim 1 wherein said beam providing means comprises a laser.

5. The optical scanning system as defined in claim 1 wherein said second angle is less than said first angle.

6. The optical scanning system as defined in claim 1 wherein said planar reflective means nutates about its axis of rotation.

7. The optical system as defined in claim 1 wherein said curved reflective means comprises a spherical optical means.

8. Apparatus for recording information from an electrical signal onto a scanned medium comprising:
   means for providing a beam of light,
   means for modulating the light beam in accordance with the information content of an electrical signal,
   rotatable planar reflective means for directing said beam upon rotation throughout a predetermined scan angle, and
   curved reflective means positioned adjacent said planar reflective means for imaging said beam as a spot and redirecting the beam directed thereto from said planar reflective means such that said spot traverses a flat focal plane proximate to the surface of a light sensitive medium,
   the plane of said planar reflective means being tilted at a first angle from an axis orthogonal to the optical axis of said curved reflective means, the axis of rotation of said planar reflective means being offset at a second angle from the plane of said planar reflective means whereby said planar reflective means provides a linear traverse of said spot in the flat focal plane as said planar reflective means is rotated about its axis of rotation.

9. The system as defined in claim 8 wherein the radius $r$ of an arcuate focal plane which normally would be traversed by the beam directed from said planar reflective means and the radius $R_1$ of said curved reflective means is related by the equation $$d \simeq (2(d/R_1) - 1.0)(r - t_0,$$

where $d$ is the back focal length between the flat focal plane and the curved surface of said curved reflective means and $t_0$ is the distance from the intersection of the optical axis of said curved reflective means with the center of rotation of said reflective means along the optical axis.

10. The system as defined in claim 9 wherein said planar reflective means is a planar mirror.

11. The apparatus as defined in claim 8 wherein said beam providing means comprises a laser.

12. The apparatus as defined in claim 8 wherein said second angle is less than said first angle.

13. The apparatus as defined in claim 8 wherein said planar reflective means nutates about its axis of rotation.

14. The apparatus as defined in claim 8 wherein said curved reflective means comprises spherical optical means.

* * * * *